United States Patent [19]

Sammaritano

[11] 3,927,637
[45] Dec. 23, 1975

[54] POSITIVE SUB-SURFACE UTILITY LINE AND THE LIKE INDICATOR

[76] Inventor: Michael Sammaritano, 1808 Vails Gate Heights Drive, Newburgh, N.Y. 12550

[22] Filed: Sept. 14, 1973

[21] Appl. No.: 397,607

[52] U.S. Cl.................. 116/114 R; 116/DIG. 14
[51] Int. Cl.² ............................................ G01D 21/00
[58] Field of Search......... 116/114 R, 173, 174, 175, 116/DIG. 14; 52/103; 248/38, 44, DIG. 4

[56] References Cited
UNITED STATES PATENTS

| | | | |
|---|---|---|---|
| 1,004,188 | 9/1911 | Olds | 52/103 |
| 3,204,355 | 9/1965 | Whitman | 116/DIG. 14 X |
| 3,503,163 | 3/1970 | Lutz | 52/103 |
| 3,523,515 | 8/1970 | Brown | 116/114 R |
| 3,568,626 | 3/1971 | Southworth, Jr. | 116/114 R |

Primary Examiner—Richard C. Queisser
Assistant Examiner—Joseph W. Roskos
Attorney, Agent, or Firm—Frank J. Jordan

[57] ABSTRACT

This is a positive sub-surface utility line and the like indicator especially useful for providing a sure indication of the location of a sub-surface conduit or structure. The indicator is positively connected to the sub-surface conduit or structure, preferably by means of a measurement tape or the like, which indicates the distance the sub-surface conduit or structure is from the indicator which is located on the surface. Other features of the indicator include a flag-pole combination unit for providing an elevated visual view of the indicator, a recessed, protected pouch for containing information relative to the sub-surface conduit or structure, and a visual, surface symbol providing rapid indication of the nature of the sub-surface conduit or structure.

1 Claim, 5 Drawing Figures

POSITIVE SUB-SURFACE UTILITY LINE AND THE LIKE INDICATOR

BACKGROUND OF THE INVENTION

1. Field of the Invention

This invention relates generally to sub-surface indicators and, more particularly, relates to positive sub-surface utility line and the like indicators which are connected directly to the sub-surface structure, conduit, line, or the like.

2. Background of the Prior Art

In the past, various techniques were used to indicate the location of sub-surface structures or conduits. The general method of providing a visual surface indication of the location of an underground or sub-surface structure was to place a surface monument type of stone over the area of the sub-surface structure. A major disadvantage of this commonly used prior art technique was that it was not a reliable way to identify the precise location of an underground structure. The reason for this is that the spaced surface monument was placed down on a refilled area that was redeposited after placement of the sub-surface trench. Thus, since the surface monument or locator of the prior art was placed onto a refilled surface area, it was not always possible to precisely locate the monument over the underground structure because of the difficulty in locating the monument directly over a covered and hidden underground structure.

Hence, a need existed to provide a positive sub-surface underground structure indicator that would reliably and consistently identify the precise location, at the surface of the location of the underground structure directly beneath the indicator.

SUMMARY OF THE INVENTION

It is an object of this invention to provide a positive sub-surface indicator.

It is another object of this invention to provide a reliable, relatively low-cost, positive sub-surface indicator.

It is a further object of this invention to provide a positive sub-surface indicator which can disclose the precise distance between the indicator and a portion of the underground structure located directly beneath the indicator.

It is still another object of this invention to provide a positive sub-surface indicator which can reveal information regarding the type of underground structure and various features relating to the underground structure.

DESCRIPTION OF THE SPECIFICATION

Figure 1:
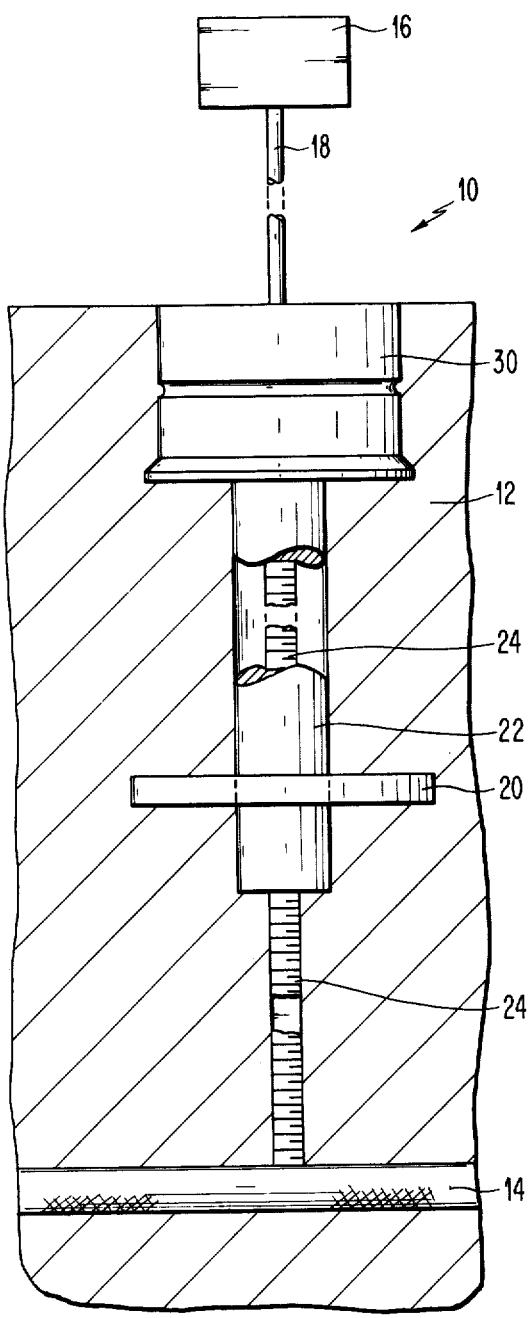
FIG. 1 is an elevational view of the position and appearance of the positive sub-surface indicator of this invention above the ground and through the ground into contact with the underground structure.

Referring to FIG. 1, and indicator generally designated by reference numeral 10 is shown in ground 12 above an underground structure 14 which in the illustrative example is a sub-surface underground electrical cable containing one or more electrical conductors. If desired, the indicator 10 can be used to designate the location of any other type of underground structure.

A flag 16 is located directly above the indicator 10 and serves to provide an elevated visual indication of the location of the indicator 10. The flag 16 is connected to the indicator 10 by means of pole or stem 18.

For the purpose of holding in place the surface portion of the indicator 10 to avoid movement thereof, a horizontal member 20 is connected to a stem 22 which, in turn, is connected to the indicator 10 by means of mating threads between a portion of the indicator 10 and the end of the stem 22.

Figure 4:
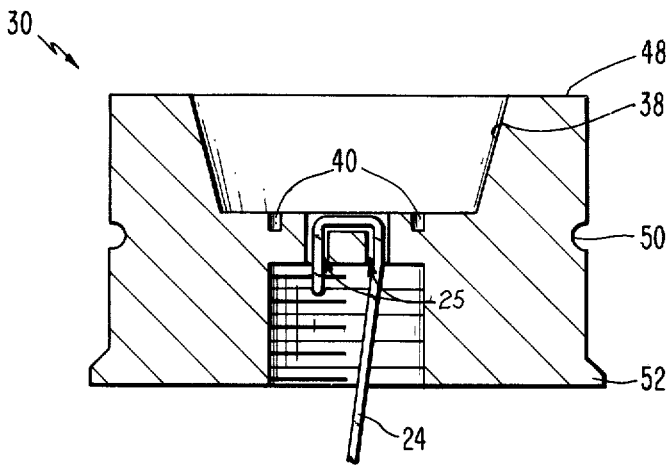
FIG. 4 is an elevational cross-sectional view of the main housing of the indicator of FIGS. 1, 2 and 3.

A measuring tape 24, or other elongated distance indicating member, is attached to the underground structure 14 that is being identified by the indicator 10. Preferably, the tape 24 is passed through the stem 22 and looped through openings 25 of a housing 30 (see FIG. 4). Instead of a measuring tape, one could use any kind of tape, cord or similar distance indication means which would provide an exact indication of the depth of the underground structure 14 from the surface portion of the indicator 10. Preferably, the measuring tape 24 is used to provide an exact indication of the depth of the underground structure 14 from the top of the indicator 10.

In the process of laying or positioning the underground structure 14 in a ditch, trench or the like, the measuring tape 24 is attached thereto at desired intervals such as by tying the tape 24 around the structure 14 and leaving the tape end at the top of the ditch for connection through the hollow stem 22 and into the indicator 10 so as to provide a visual identification, after removal of the top portion of the indicator, of the distance that the underground structure 14 is from the top of the indicator 10. Additionally, the positive contact between the underground structure 14 and the indicator 10 provides a sure, reliable way to consistently know the precise distance and the actual location of the underground structure 14 from the indicator 10.

Figure 2:
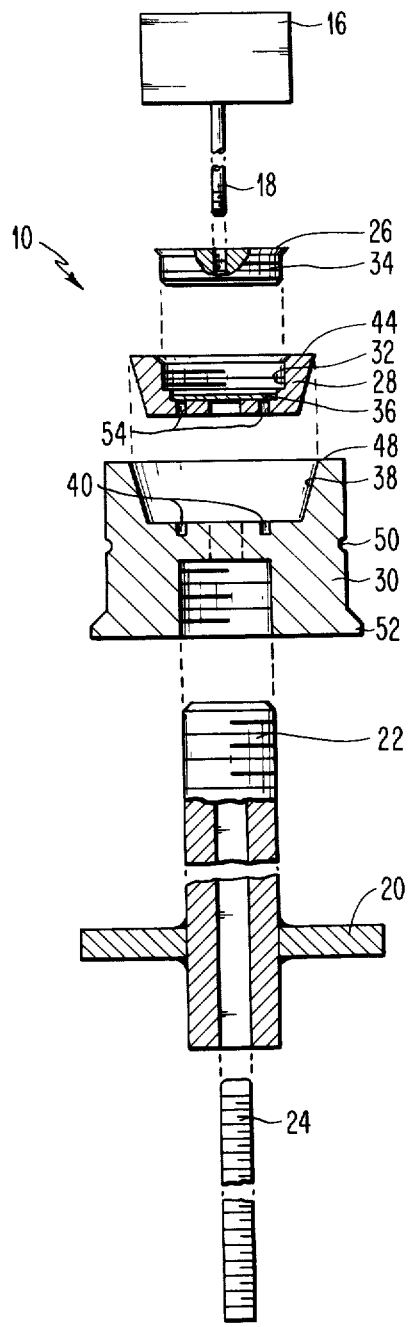
FIG. 2 is an exploded cross-sectional view of the indicator parts of FIG. 1 without the measuring tape.

Referring to FIG. 2, an exploded sectional view is shown of the indicator 10 of FIG. 1. The indicator 10 comprises a cap member 26 which is threadably connectable to a container 28 which is insertable within the housing 30. The container 28 has a threaded hollow portion 32 for engagement with threaded extension portion 34 of the cap member 26. An identification pouch 36 is preferably placed at the flat surface bottom of the threaded hollow portion 32 of the container 28. This pouch 36 contains information within a waterproof and weather resistant envelope which identifies various points about the nature, purpose, specifications, etc. of the underground structure 14.

Figure 3:
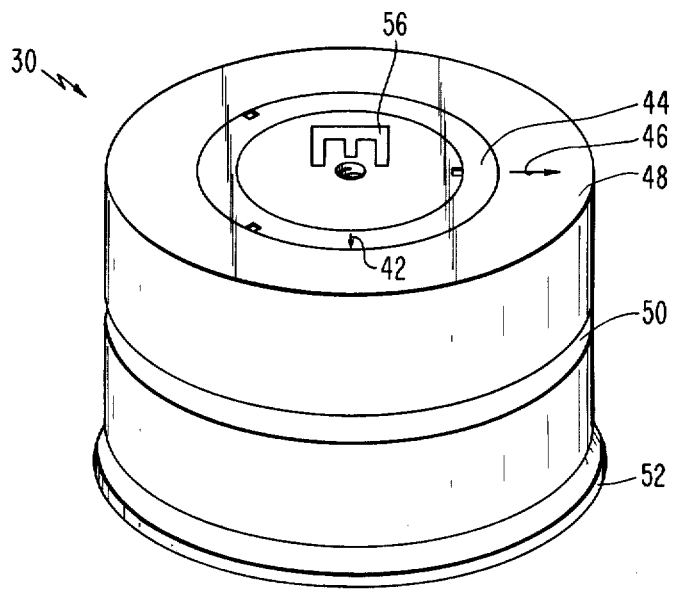
FIG. 3 is a top perspective view (without the flag) of the assembled indicator parts of FIG. 2 as it would appear at the surface vicinity in the ground.
Figure 5:
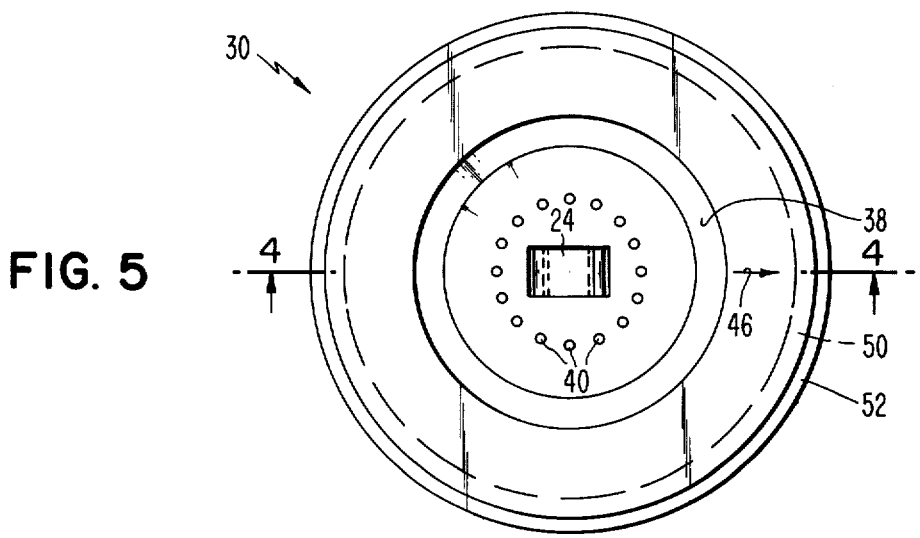
FIG. 5 is a top view looking down onto the main housing of FIG. 4.

The housing 30 comprises a recessed portion 38 which is used to hold the container 28. At the bottom of the recessed portion 38 (as can be seen with reference to FIGS. 2 and 5), is a plurality of holes 40 which are preferably located in a circular configuration. The function of these holes 40 is to permit the container 28 to be fixed at a selected position in order to point an arrow 42 (see FIG. 3) on the top surface of rim 44 of the container 28 to be directed, as desired, to reflect the direction of the underground structure 14 or, if needed, a branch thereof which may be beneath the indicator 10 at the point of intersection between the branch and the rest of the underground structure.

Holes 40 in the housing 30 are used in conjunction with two holes 54 in the container 28 to fix the position of the container 28 with respect to the housing. This is done, for example, by placing small rods (not shown) through both holes 54 and two desired holes 40 that are placed in registry with holes 54 in accordance with the direction that is desired. E symbol 56 (see FIG. 3) on cap member 26 designates that the underground structure 14 is an electrical cable. Arrow 46 on rim 48 of the housing 30 also functions similar to the arrow 42 to provide indication of direction of the underground structure, but in this example can indicate the direction of the principal portion (not the branch) of the underground structure 14. Grooves 50 and flange 52 of the housing 30 provide further means to hold the indicator 10 in a fixed position in the ground surface.

I claim:

1. A device for providing at ground surface the location and depth of an underground conduit as well as the direction said conduit extends comprising:
    a measuring tape adapted to be fastened at one end thereof to said conduit;
    a housing adapted to be placed adjacent to said ground surface, said housing having a recessed portion at the top thereof and an orifice extending from the bottom of said recessed portion through the bottom of said housing with the other end of said tape extending through said orifice;
    a container for fitting snugly within said recess, said container being generally dish shaped with an open top so as to be able to contain an envelope for holding information concerning said conduit;
    a number of holes in the bottom of said container arranged in a circle and an equal number of corresponding holes at the bottom of said recess in said housing so that one or more pins can be placed in holes at the bottom of said recess to extend upward into corresponding holes in said container after said container has been oriented to a desirable position with respect to said housing and placed down snugly within said recess and;
    a cap serving as a closure for the open top of said container;
    whereby, when said housing has been placed adjacent to said ground surface, indicia on said container can indicate the direction of said conduit when said container has been properly oriented with respect to said housing and said container can be removed so that the other end of said measuring tape is visible to indicate the depth of said conduit when said one end of said measuring tape is fastened to said conduit.

* * * * *